(12) United States Patent
Senior (10) Patent No.: US 12,311,570 B1
(45) Date of Patent: May 27, 2025

(54) METHODS AND BONDING AGENTS FOR FORMING WOOD VENEERS WITH NO ADDED FORMALDEHYDE ADHESIVES

(71) Applicant: Greene Rev LLC, Greensboro, NC (US)

(72) Inventor: Paul D. Senior, Greensboro, NC (US)

(73) Assignee: Greene Rev LLC, Greensboro, NC (US)

( * ) Notice: Subject to any disclaimer, the term of this patent is extended or adjusted under 35 U.S.C. 154(b) by 0 days.

(21) Appl. No.: 18/781,079

(22) Filed: Jul. 23, 2024

(51) Int. Cl.
| | | |
|---|---|---|
| *B27D 3/00* | (2006.01) | |
| *B27D 5/00* | (2006.01) | |
| *B32B 7/12* | (2006.01) | |
| *B32B 21/13* | (2006.01) | |
| *B32B 21/14* | (2006.01) | |
| *B32B 37/06* | (2006.01) | |
| *B32B 37/10* | (2006.01) | |
| *B32B 37/12* | (2006.01) | |

(Continued)

(52) U.S. Cl.
CPC .............. *B27D 3/00* (2013.01); *B27D 5/00* (2013.01); *B32B 7/12* (2013.01); *B32B 21/13* (2013.01); *B32B 21/14* (2013.01); *B32B 37/06* (2013.01); *B32B 37/10* (2013.01); *B32B 37/1284* (2013.01); *C09J 5/00* (2013.01); *C09J 11/06* (2013.01); *C09J 11/08* (2013.01); *C09J 175/04* (2013.01); *B32B 2255/08* (2013.01); *B32B 2255/26* (2013.01); *B32B 2307/7376* (2023.05); *B32B 2309/02* (2013.01); *B32B 2309/12* (2013.01); *B32B 2310/021* (2013.01); *B32B 2317/16* (2013.01); *B32B 2607/00* (2013.01)

(58) Field of Classification Search
USPC ................. 219/765, 773; 156/256, 263, 264
See application file for complete search history.

(56) References Cited

U.S. PATENT DOCUMENTS

| | | | |
|---|---|---|---|
| 3,205,111 A | | 9/1965 | Williamson et al. |
| 3,232,811 A | * | 2/1966 | Coulter .................... B27D 1/04 |
| | | | 156/275.5 |

(Continued)

FOREIGN PATENT DOCUMENTS

| | | |
|---|---|---|
| EP | 1275481 A2 | 1/2003 |
| SU | 1530449 A1 | 12/1989 |

(Continued)

OTHER PUBLICATIONS

Website information pages from http://www.acfairbankconsulting.ca/vicwoodfaq.htm, Frequently Asked Questions About Vicwood, printed Aug. 31, 2009, 10 pages.

(Continued)

*Primary Examiner* — Linda L Gray
(74) *Attorney, Agent, or Firm* — Womble Bond Dickinson (US) LLP (57) ABSTRACT

A method for forming an engineered veneer block includes stacking a plurality of laminate layers. The method also includes spreading a bonding agent between each layer of the plurality of laminate layers. The bonding agent includes an adhesive. The adhesive consists essentially of one or more no added formaldehyde adhesives. The method also includes slicing an engineered veneer from the engineered veneer block. The engineered veneer has a thickness in the range of 0.1 millimeters to 0.5 millimeters.

19 Claims, 8 Drawing Sheets

(51) Int. Cl.
    *C09J 5/00*     (2006.01)
    *C09J 11/06*     (2006.01)
    *C09J 11/08*     (2006.01)
    *C09J 175/04*     (2006.01)

(56) References Cited

U.S. PATENT DOCUMENTS

| | | | |
|---|---|---|---|
| 3,312,582 | A | 4/1967 | Morris et al. |
| 3,418,195 | A | 12/1968 | Allan |
| 3,963,546 | A | 6/1976 | Roberti |
| 3,977,449 | A * | 8/1976 | Sadashige ............... B27L 5/00 |
| | | | 156/256 |
| 4,208,369 | A | 6/1980 | Kohn |
| 4,388,133 | A | 6/1983 | Hirao et al. |
| 4,465,539 | A | 8/1984 | Saihara et al. |
| 4,536,427 | A | 8/1985 | Kohn |
| 4,731,145 | A | 3/1988 | Senzani |
| 4,930,556 | A | 6/1990 | Prihoda |
| 4,942,084 | A | 7/1990 | Prince |
| 5,015,320 | A | 5/1991 | Abendroth et al. |
| 5,040,582 | A | 8/1991 | Hsu |
| 5,074,092 | A | 12/1991 | Norlander |
| 5,098,762 | A | 3/1992 | Nakajima |
| 5,145,537 | A | 9/1992 | Senzani |
| 5,362,520 | A | 11/1994 | Rodriguez |
| 5,418,034 | A | 5/1995 | McGuire, III |
| 5,942,008 | A | 8/1999 | Curto |
| 5,979,524 | A | 11/1999 | Trost |
| 6,298,888 | B1 | 10/2001 | Murai |
| 6,481,476 | B1 | 11/2002 | Okamoto |
| 6,497,937 | B1 | 12/2002 | Lam et al. |
| 6,757,058 | B1 | 6/2004 | Carman et al. |
| 6,888,635 | B2 | 5/2005 | Lacovara |
| 6,913,049 | B2 | 7/2005 | Meyer et al. |
| 7,324,904 | B2 | 1/2008 | Floyd et al. |
| 7,347,912 | B2 | 3/2008 | Engel et al. |
| 8,414,996 | B2 | 4/2013 | Senior |
| 9,242,391 | B2 | 1/2016 | Senior |
| 2002/0031620 | A1 | 3/2002 | Yuzawa et al. |
| 2002/0038482 | A1 | 4/2002 | Mennicke et al. |
| 2005/0282988 | A1 * | 12/2005 | Li ............................ C09J 5/00 |
| | | | 527/200 |
| 2007/0102108 | A1 * | 5/2007 | Zheng .................... B32B 37/12 |
| | | | 156/272.2 |
| 2007/0137323 | A1 | 6/2007 | Floyd et al. |
| 2007/0289709 | A1 | 12/2007 | Chong et al. |
| 2007/0292656 | A1 | 12/2007 | Handojo |
| 2008/0078473 | A1 | 4/2008 | Huang et al. |
| 2008/0156435 | A1 | 7/2008 | Kingma et al. |

FOREIGN PATENT DOCUMENTS

| | | |
|---|---|---|
| WO | 0066335 A1 | 11/2000 |
| WO | 03084760 A1 | 10/2003 |

OTHER PUBLICATIONS

Daniels, United States Trade in Wood Products, 1978-2005, General Technical Report, May 2008, 67 pages.
Daniels, United States Trade in Wood Products, 1978-2005, General Technical Report, May 2008, 71 pages.
United Nations Conference on Trade and Development, Trade and Development Report: Responding to the Global Crisis, Climate change mitigation and development, 2009, 218 pages, United Nations Publication, New York and Geneva.
Harmonized Tariff Schedule of the United States (2009)—Supplement 1; Wood and Articles of Wood; Wood Charcoal; Cork and Articles of Cork; Manufacturers of Straw, of Esparto or of Other Plaiting Materials; Basketware and Wickerwork, 31 pages.
Wang, The Development of China's Forestry Sector and the Opportunities for Canada, journal, Sep. 2009, 53 pages, Foreign Policy for Canada's Tomorrow, No. 6, Canadian International Council.
Mace, Global Commodity Chains, Alternative Trade and Small-Scale Coffee Production in Oaxaca, Mexico (Masters Thesis), 1998, 42 pages.
Ince, et al., Globalization and World Trade, chapter 13 in Resource and Market Projections for Forest Policy Development, edited by Darius Adams and Richard Haynes, 2007, 31 pages, Springer, The Netherlands.
World Customs Organization, Glossary of International Customs Terms, May 2006, 30 pages, World Customs Organization, Belgium.
Harmonized Tariff Schedule of the United States (2009)—Supplement 1, Effective Feb. 1, 2009; Wood and Articles of Wood; Wood Charcoal; Cork and Articles of Cork; Manufacturers of Straw, of Esparto or of Other Plaiting Materials; Basketware and Wickerwork, 31 pages.
The Brussels Definition of Value and The Gatt Valuation Agreement: A Comparison, 42 pages, Feb. 26, 1985, Brussels.
United Nations Conference on Trade and Development, The Feasibility of a Tropical Plywood Futures Contract, Apr. 1, 1998, 63 pages.
US Census Bureau, Hardwood Veneer and Plywood Manufacturing: 2002 Economic Census, Jan. 2005, 46 pages.
Acquah, et al., The Potential for Ghana's Wood/Wood Products in the U.S. Market, May 1998, 140 pages.
Butterworth, et al., GAIN Report: China, Peoples Republic of Solid Wood Products Annual 2005, Jul. 15, 2005, 27 pages.
Achilles, GAIN Report: Germany, Solid Wood Products Annual 2006, Dec. 14, 2006, 23 pages.
Bromokusumo, GAIN Report: Indonesia, Solid Wood Products Annual 2006, Jun. 28, 2006, 14 pages.
Phillips, et al., GAIN Report: Korea, Republic of, Solid Wood Products Annual 2006, Jun. 19, 2006, 33 pages.
Lozano, GAIN Report: Mexico, Solid Wood Products, Mexico Announces Final Rule for Wood Packaging Materials Effective Sep. 16, Feb. 28, 2005, 5 pages.
Leister, GAIN Report: South Africa, Republic of, Exporter Guide Annual Report, Jul. 14, 2005, 21 pages.
AgExporter—The Monthly Magazine for Food and Agricultural Exporters, Apr. 2003, 20 pages.
High-End U.S. Wood Products Make Music . . . and More . . . in Indonesia, AgExporter (magazine), Apr. 2003, 3 pages.
Determination of Wood Panel Uniformity by Means of Optical Sensor Technology, Dr. Herman Van Dyk (Department of Wood and Paper Science), Aditya Ram'Nataraj (Integrated Manufacturing Systems and Engineering Department), known at least as of Sep. 23, 2010, 30 pgs.
Forest Stewardship Council, FSC International Standard, FSC Principles and Criteria for Forest Stewardship, FSC-STD-01-001 (Version 4-0) EN, 1993, 13 pgs.
Forest Stewardship Council, FSC Standard, SLIMF Eligibility Criteria, FSC-STD-01-003 (Version 1-0) EN, Sep. 15, 2004, 5 pgs.
Forest Stewardship Council, FSC Standard, SLIMF Eligibility Criteria—Addendum, FSC-STD-01-003a EN, Feb. 24, 2010, 5 pgs.
Forest Stewardship Council, Structure and Content of Forest Stewardship Standards, FSC-STD-20-002 (Version 2-1), Nov. 30, 2004, 13 pgs.
Forest Stewardship Council, FSC International Standard, Structure, Content and Local Adaptation of Generic Forest Stewardship Standards, FSC-STD-20-002 (V3-0) En, Aug. 31, 2009, 13 pgs.
Forest Stewardship Council, FSC Standard, Local Adaptation of Certification Body Generic Forest Stewardship Standards, FSC-STD-20-003 (Version 2-1) EN, Nov. 2004, 9 pgs.
Forest Stewardship Council, Forest Pre-evaluation Visits, FSC-STD-20-005 (Version 2-1), Nov. 30, 2004, 4 pgs.
Forest Stewardship Council, Stakeholder Consultation for Forest Evaluation, FSC-STD-20-006 (Version 2-1), Nov. 30, 2004, 7 pgs.
Forest Stewardship Council, FSC International Standard, Stakeholder Consultation for Forest Evaluations, FSC-STD-20-006 (V3-0) EN, Aug. 31, 2009, 12 pgs.
Forest Stewardship Council, FSC Standard, Forest Management Evaluation, FSC-STD-20-007 (Version 2-1) EN, Nov. 30, 2004, 46 pgs.

(56) References Cited

OTHER PUBLICATIONS

Forest Stewardship Council, FSC International Standard, Forest Management Evaluations, FSC-STD-20-007 (V3-0) En, Aug. 31, 2009, 27 pgs.
Forest Stewardship Council, FSC International Standard, Forest Management Evaluations Addendum—Forest Certification Reports, FSC-STD-20-007a (V1-0) En, Aug. 31, 2009, 14 pgs.
Forest Stewardship Council, FSC International Standard, Forest Management Evaluations Addendum—Forest Certification Public Summary Reports, FSC-STD-20-007b (V1-0) En, Aug. 31, 2009, 8 pgs.
Forest Stewardship Council, FSC Standard, Forest Certification Reports, FSC-STD-20-008 (Version 2-1) EN, Nov. 30, 2004, 13 pgs.
Forest Stewardship Council, FSC Standard, Forest Certification Public Summary Reports, FSC-STD-20-009 (Version 2-4) EN, Nov. 30, 2004, 7 pgs.
Forest Stewardship Council, FSC Standard, Accreditation Standard for Chain of Custody Evaluations, FSC-STD-20-011 (Version 1-1) EN, Nov. 2007, 34 pgs.
Forest Stewardship Council, FSC Standard, Standard for Evaluation of FSC Controlled Wood in Forest Management Enterprises, FSC-STD-20-012 (Version 1-1) EN, Mar. 2007, 18 pgs.
Forest Stewardship Council, FSC Standard for Group Entities in Forest Management Groups, FSC-STD-30-005 (V1-0 Draft 2-0), May 5, 2009, 14 pgs.
Forest Stewardship Council, FSC Standard, FSC Controlled Wood Standard for Forest Management Enterprises, FSC-STD-30-010 (Version 2-0) EN, Oct. 4, 2006, 16 pgs.
Forest Stewardship Council, FSC Standard, Standard for Multi-site Certification of Chain of Custody Operations, Fsc- STD-40-003 (Version 1-0) EN, Jun. 2007, 12 pgs.
Forest Stewardship Council, FSC Standard FSC Standard for Chain of Custody Certification, FSC-STD-40-004 (Version 2-0) EN, Nov. 2007, 26 pgs.
Forest Stewardship Council, Addendum to FSC Standards FSC-STD-40-004, Fsc Product Classification, FSC- STD-40-004a (Version 1-0) EN, Dec. 20, 2007, 16 pgs.
Forest Stewardship Council, Addendum to FSC Standard FSC-STD-40-004, Fsc Species Terminology FSC-STD-40-004b (Version 1-0) EN, Dec. 20, 2007, 25 pgs.
Forest Stewardship Council, FSC Standard, Standard for Company Evaluation of FSC Controlled Wood, FSC-STD-40-005 (Version 2-1) EN, Oct. 4, 2006, 28 pgs.
Forest Stewardship Council, FSC Standard, FSC Chain of Custody Standard for Project Certification, FSC-STD-40-006 (Version 1-0) EN, Jun. 2006, 19 pgs.
Forest Stewardship Council, FSC Standard, FSC Standard for Sourcing Reclaimed Material for Use in FSC Product Groups or FSC-certified Projects, FSC-STD-40-007 (Version 1-0) EN, Nov. 2007, 8 pgs.
Formaldehyde Emissions—Understanding the standards. Paper by Stephen Young, May 2004, 4 pgs.
Website informational pages from http://www.hardwoods-inc.com/green.sub.--eco.sub.--friendly.aspx about Hardwoods Echo Wood Eco Wood Green Echo-Friendly, Echowood Bamboo and Echo-wood Wood Veneers, printed Aug. 28, 2009, 10 pages.
Kretschmann, et al., Effect of Various Proportions of Juvenile Wood on Laminated Veneer Lumber, Jul. 1993, 35 pages.
Website information from http://www.faqs.org/rulings/rulings1991HQ0088338.html, printed Sep. 15, 2009, 3 pages.
Busch, The Evolution of the Wood Panel, Interiors & Sources magazine, May 2009, 7 pages.
Peterson, et al., Paper Birch Managers' Handbook for British Columbia, Mar. 1997, 44 pages.
Affre, et al., Looking Under the Veneer, Implementation Manual on EU Timber Trade Control: Focus on Cites—Listed Trees, Mar. 2004, 72 pages, Brussels.
Cites . . . and the Wood Products Trade . . . What you should know, pamphlet, Mar. 2001, 2 pages.

Convention on International Trade in Endangered Species of Wild Fauna and Flora, notes from the Second meeting of the Mahogany Working Group Belem (Brazil), Oct. 6-8, 2003, 3 pages.
Forest Stewardship Council, Controlled Wood, guide, 2007, 8 pages.
Global Forest & Trade Network, Newsletter, Apr. 2009, 12 pages.
WWF Guidelines for Investment in Operations that Impact Forests, Version 1.0, Sep. 2003, 59 pages.
MacQueen, et al., Distinguishing community forest products in the market: Industrial demand for a mechanism that brings together forest certification and fair trade, 2008, 124 pages, International Institute for Environment and Development, United Kingdom.
MacQueen, et al., Exploring fair trade timber: A review of issues in current practice, institutional structures and ways forward, 2006, 120 pages, International Institute for Environment and Development, United Kingdom.
ITTO Action Plan 2008-2011, ITTO Policy Development Series No. 18, 2008, 25 pages, ITTO.
Criteria and Indicators for Sustainable Management of Natural Tropical Forests, ITTO Policy Development Series No. 7, 1998, 28 pages, ITTO.
ITTO Guidelines for the Establishment and Sustainable Management of Planted Tropical Forests, ITTO Policy Development 4, 1993, 44 pages, ITTO.
New Directions for Tropical Plywood: Proceedings of an ITTO/FAO International Conference on Tropical Plywood, Technical Series 26, 2006, 162 pages, ITTO.
Website information pages from http://www2.dpi.qld.gov.au/hardwoodsqld/1816.html, informational guide, printed May 31, 2009, 3 pages.
Wilson, et al., Developing a forest resource on industrial cutaway peatland: The BOGFOR programme, 2008, 192 pages, COFORD, National Council for Forest Research and Development, Dublin, Ireland.
Forest Products Special, various articles, 2005, 109 pages, vol. 5.
Cameron, Managing birch woodlands for the production of quality timber, article, 1996, 1 page, printed from http://forestry.oxfordjournals.org/cgi/content/abstract/69/4/357.
Acker, et al., Cost Action E44 Conference in Milan on: A European Wood Processing Strategy: Future Resources Matching Products and Innovations, May 30 and Jun. 2-3, 2008, 160 pages, Milan, Italy.
Wooden, et al., Lake States Woodlands: Aspen Management, report, 1996, 6 pages, University of Wisconsin System Board of Regents, U.S.A.
Castro, et al., New Technologies and Alternative Uses for Poplar Wood, report, 2006, 10 pages, Italy.
Verani, et al., International Poplar Commission Thematic Papers: Field Handbook—Poplar Harvesting, Working Paper IPC/8, 2008, 60 pages, Forestry Department: Food and Agriculture Organization of the United Nations.
Poplars, Willows and People's Wellbeing: Publications Listed in Country Progress Reports, 23rd Session of the International Poplar Commission, Beijing, China, FAO Working Paper IPC/7, Oct. 2008, 80 pages.
Sanded Plywood, product guide, 1999, 16 pages, APA—The Engineered Wood Association.
Website Information pages from http://www.greenlineforest.com/pages/manufacturing2.html, L4 Natural Dyed Wood Veneers, printed Aug. 27, 2009, 3 pages.
Bleaching (a shortened version of an article published in Ullmann's Encyclopedia of Industrial Chemistry by Wiley-Vch Verlag Gmbh & Co. KGaA in 2006, written by Hans Ulrich Suss, Degussa AG, Hanau, Germany), 10 pages.
Mitigation of the UV-driven discolouration of reconstituted and dyed veneers, report, Jan. 2008, 106 pages, project No. PNo7.2036, Forest and Wood Products Australia Limited, Australia.
ITTO Action Plan—Criteria and Priority Areas for Programme Development and Project Work, International Tropical Timber Organization, Ninth Session, Yokohama, Nov. 16-23, 1990, 26 pgs.
Pureview, Huntsman—Enriching Lives Through Innovation, Jul. 2009, 17 pgs.

(56) References Cited

OTHER PUBLICATIONS

Utsugi, et al., International Association of Societies of Design Research—The Hong Kong Polytech NIC University, Nov. 12-15, 2007, Visual Character of Board-Formed Environment Consious Materials, 15 pgs.
U.S. Department of Commerce Technology Administration, National Institute of Standards and Technology, Voluntary Product Standard, PS 1-95, Construction and Industrial Plywood, Mar. 1996, 49 pgs.
Smith, et al., Competitiveness of Forest Products at Global Markets' with Particular Emphasis on Tropical Forest Products and on Small and Medium Scale Producers; Market Review in the U.S. of Selected Timber Products, report, Jan. 23, 2008, 38 pages.
ITTO Action Plan 2008-2011, report, 2008, 25 pages, ITTO Policy Development Series No. 18, Japan.
Nussbaum, et al., Modular Implementation and Verification (MIV): a toolkit for the phased application of forest management standards and certification, guide, Nov. 2003, 95 pages, United Kingdom.
North American forest products market crash spreads throughout UNECE region; Green building combats climate change, press release, Oct. 29, 2008, 9 pages, Geneva.
Bull, Plantations: Facts and Figures, presentation, Sep. 9, 2004, 25 pages, Vancouver, Canada.
Watershed: People's Forum on Ecology; periodical; 2004, 60 pages, vol. 9, No. 3 Mar.-Jun. 2004, Towards Ecological Recovery and Regional Alliance (TERRA), Bangkok, Thailand.
White, et al., Responsible Purchasing of Forest Products (second edition), guide, Jul. 2006, 58 pages, WWF International/World Wildlife Fund for Nature.
Focus, magazine, Jul./Aug. 2004, 8 pages, Issue #39, London.
Practitioner's Guide to the Implementation of the IPF Proposals for Action, Second Revised Edition, May 1999, 94 pages.
Website information pages from http://en.wikipedia.org/wiki/sustainable.sub.--forest.sub.--management, Sustainable forest management, printed Sep. 7, 2009, 17 pages.
Global Forest Resources Assessment Update 2005: Terms and Definitions (final version), Working Paper 83, 2004, 350 pages, Rome, Italy.
Tropical Timber Market Report, 2009, 22 pages, vol. 14, No. 16, ITTO.
United Nations General Assembly, Non-legally binding instrument on all types of forests, Oct. 22, 2007, 10 pages.
Winady, et al., United States Department of Agriculture, Using Wood Composites as a Tool for Sustainable Forestry, Proceedings of Scientific Session 90, XXII IUFRO World Congress, General Technical Report, 2005, 100 pages.
Duke, et al., Biodiversity and Environmental Assessment Toolkit, Mar. 2000, 65 pages.
WWF Guidelines for Investment Operations that Impact Forests, Version 1.0, Sep. 2003, 59 pages.
Website informational pages from http://www.alpi.it/uk/Articolo.asp?IdArt=118 about the Alpilignum Production Process, printed on Aug. 26, 2009, 2 pages.
Website informational pages from http://www.alpi.it/uk/dovesiamo.asp on how to contact ALPI headquarters in Modigliana, Italy, printed Aug. 26, 2009, 2 pages.
Echo Wood Reconstituted Real Wood Veneer Specification Sheet (general informational handout), Sep. 2008, 5 pages.
Website informational pages from http://www.hardwoods-inc.com/products.aspx?subnav=Id7-ef818af20b7b about Hardwoods Hardwoods Dragon Ply Echowood Rely-A-Form Hardwood Lumber Plywood Overlay Products, printed Aug. 28, 2009, 6 pages.
Hardwood Plywood Handbook, handbook, 2004, 70 pages, Hardwood Plywood Veneer Association, USA.
Veneer Species Guide, handbook, 2006, 79 pages, Hardwood Plywood Veneer Association, USA.
American National Standard for Hardwood and Decorative Plywood, handbook, 2004, 54 pages, Hardwood Plywood & Veneer Association, USA.

Voluntary Standard for Sliced Decorative Wood Face Veneer, informational guide, original publication date Jan. 5, 1996, 13 pages, Hardwood Plywood & Veneer Association, USA.
Castro, et al., Multilaminar wood: Manufacturing process and main physical-mechanical properties, article in Forest Products Journal, 2004, 7 pages, vol. 54, No. 2, Forest Products Society.
Website informational pages from Greenline, How to Specify Greenline Fineline Reconstituted Wood Veneers, printed Aug. 26, 2009, 2 pages.
Website information pages from http://www.greenlineforest.com/pages/reconstituted.html, printed Aug. 27, 2009, 3 pages.
Website information pages from http://www.greenlineforest.com/pages/specify.sub.--veneers2.html, How to Specify Greenline L4 Natural Dyed Veneers, printed Aug. 27, 2009, 2 pages.
Website information pages from http://www.greenlineforest.com/pages/specify.sub.--veneers.html, How to Specify Greenline Fineline Reconstituted Wood Veneers, printed Aug. 27, 2009, 2 pages.
Website information pages from http://www.greenlineforest.com/pages/sustainable2.html, An Endangered Earth, printed Aug. 27, 2009, 2 pages.
Website information pages from http://www.greenlineforest.com/pages/technical.html, Greenline L4 Natural Dyed Wood Veneers, printed Aug. 27, 2009, 2 pages.
Website information pages from http://www.greenlineforest.com/pages/veneer.sub.--intro.html, printed Aug. 27, 2009, 2 pages.
Website information pages from http://www.blueridgesales.ca/qs/page/5672/5666/-1, Manufacturers Agent of Premium Wood Products, printed Aug. 26, 2009, 8 pages.
Website information pages from http://www.greenlineforest.com/pages/sustainable.htm, An Endangered Earth, printed Aug. 27, 2009, 2 pages.
Ipir, Source and Supply of Sustainable Raw Material, letter, Sep. 27, 2006, 1 page.
Winandy, et al., United States Department of Agriculture, Using Wood Composites as a Tool for Sustainable Forestry, Proceedings of Scientific Session 90, Xxii Iufro World Congress, General Technical Report, 2005, 97 pages.
Chunquan, et al., China's Wood Market, Trade and the Environment, report, 2004, 81 pages, Science Press USA Inc. and WWF International, Beijing, China.
Kun, et al., Demand and Supply of Wood Products in China, report, 2007, 77 pages, Food and Agriculture Organization of the United Nations, Rome, Italy.
FSC Standard: FSC Chain of Custody Standard for Companies Supplying and Manufacturing FSC-Certified Products, 2004, 28 pages, Forest Stewardship Council, A.C., Bonn, Germany.
FSC Principles and Criteria for Forest Stewardship, 2004, 11 pages, Forest Stewardship Council, A.C.
Hain, et al., FSC Group Certification Toolkit, 2005, 77 pages.
Evans, et al., Guide to Participatory Tools for Forest Communities, 2006, 43 pages, Center for International Forestry Research, Indonesia.
Stewart, et al., Good practice guidelines for High Conservation Value assessments: A practical guide for practitioners and auditors, 2008, 48 pages, ProForest, United Kingdom.
Website information pages from http://www2.ffpri.affrc.go.jp/fdb/esawoodq/Def.html, Definition of Properties, printed Sep. 7, 2009, 3 pages.
European Search Report for EP Application No. 10190174.2, dated Nov. 20, 2013, 9 pgs.
Ye, Wood Composite Made of Populus Plantation Material in China, technical report, 9 pages, known at least as early as Apr. 22, 2010.
Waverley Council, NSW, The Good Wood Guide: A Residents Guide to Purchasing Environmentally Friendly Timber, 9 pages, known at least as early as Sep. 28, 2010.
Website information pages from http://www.alibaba.com/product-free/101370642/Bb-Cc-Plywood-Okoume-Plywood-Bintangor-Plywood-Red-Hardwood-Plywood- . . . , printed Sep. 1, 2009, 4 pages, Sep. 1, 2009.
Core Prex: Engineered wood veneer, brochure, 15 pages, Italy, known at least as early as Sep. 23, 2010.
Echo Wood: Facts & Specifications (informational handout), 1 page, known at least as early as Sep. 23, 2010.

(56) References Cited

OTHER PUBLICATIONS

Website informational pages from http://www.hardwoods-inc.com/green-eco-friendly.aspx about Hardwoods Echo Wood Eco Wood Green Echo-Friendly, Echowood Bamboo and Echo-wood Wood Veneers, printed Aug. 28, 2009, 10 pages.
Website informational pages from http://www.hardwoods-inc.com/products.aspx?subnav=Id7-ef818af20b7b about Hardwoods Hardwoods Dragon Ply Echowood Rely-A-Form Hardwood Lumber Plywood Overylay Products, printed Aug. 28, 2009, 6 pages.
Plywood Association of Australia (PAA), Plywood 'The Only Engineered Wood Panel' (informational sheets); 3 pages, known as early as Sep. 23, 2010.
Greenline, Fineline Veneer Manufacturing Process, brochure, 3 pages, know at least as early as Sep. 23, 2010.
Website information pages from http://www.greenlineforest.com/pages/specify-veneers2.html, How to Specify Greenline L4 Natural Dyed Veneers, printed Aug. 27, 2009, 2 pages.
Website information pages from http://www.greenlineforest.com/pages/specify-veneers.html, How to Specify Greenline Fineline Reconstituted Wood Veneers, printed Aug. 27, 2009, 2 pages.
Website information pages from http://www.greenlineforest.com/pages/veneer-intro.html, printed Aug. 27, 2009, 2 pages.
Website information pages from http://en.wikipedia.org/wiki/sustainable-forest-management, Sustainable forest management, printed Sep. 7, 2009, 6 pages.
Mendoza, et al., Guidelines for Applying Multi-Criteria Analysis to the Assessment of Criteria and Indicators, The Criteria & Indicators Toolbox Series, 82 pages, Center for International Forestry Research (CIFOR), Indonesia, know at least as early as Sep. 23, 2010.
Lamlnex Timber Veneers, brochure, 15 pages, know at least as early as Sep. 23, 2010.
Material Explorer, description of Oval Nimbus and printouts of samples, 4 pages, known at least as early as Sep. 22, 2010.
Wood and Articles of Wood; Wood Charcoal; Cork and Articles of Cork; Manufacturers of Straw, of Esparto or of Other Plaiting Materials; Basketware and Wickerwork, 24 pages, known at least as early as Sep. 23, 2010.
Website information pages from http://www.canply.org/english/products/comparison/comparison-all.htm, 12 pages, known at least as early as Sep. 23, 2010.
Naturbind by Garnica Brochure, known at least as early as Jul. 23, 2024, 6 pages.
Website information pages from <https://www.garnica.one/en-uk/blog/naturbind.html,> known at least as early as Jul. 23, 2024, 9 pages.
ASTM E1333—10 Standard Test Method for Determining Formaldehyde Concentrations in Air and Emission Rates from Wood Products Using a Large Chamber, known at least as of Sep. 23, 2010, 6 pgs.
Agnolotti, et al. Adding more value to tropical plywood by innovative products (article), International Tropical Timber Organization, 4 pages, Known at least as early as Sep. 23, 2010.
Material Explorer, description of Alpi Concept and photos of samples, 4 pages, Known at least as early as Sep. 23, 2010.
Material Explorer, description of Alpikord Range 1 and photos of samples, 4 pages, Known at least as early as Sep. 23, 2010.
Material Explorer, description of Alpilignum Bamboo and photos of samples, 4 pages, Known at least as early as Sep. 23, 2010.
Echo Wood (product information and printouts of samples), 3 pages, Known at least as early as Sep. 23, 2010.
Hardwoods Specialty Products (informational chart), 1 page, Known at least as early as Sep. 23, 2010.
Plywood Association of Australia (PAA), Plywood The Only Engineered Wood Panel (informational sheets); 3 pages, Known at least as early as Sep. 23, 2010.
Ewpaa, Featuring Plywood in Buildings, article 23, pages, Australia, Known at least as early as Sep. 23, 2010.
Dorries, Formaldehyde Emissions from Plywood and Laminated Veneer Lumber, article, 7 pages, Australia, Known at least as early as Sep. 23, 2010.
Plywood Association of Australia, Ltd., Technical Information, 85 pages, Australia, Known at least as early as Sep. 23, 2010.
EWPAA, Plywood Manufacture: An introduction in the manufacture of plywood, including veneer manufacture, plywood fabrication and LVL, brochure, 11 pages, Known at least as early as Sep. 23, 2010.
EWPAA, Product and Specification Guide for the Professional and Home Handyperson, brochure, 20 pages, Known at least as early as Sep. 23, 2010.
EWPAA, Informational handout on Veneer Manufacture, Plywood Manufacture and Plywood Adhesives, 6 pages, Known at least as early as Sep. 23, 2010.
Greenline, Fineline Veneer Manufacturing Process, brochure, 3 pages, Known at least as early as Sep. 23, 2010.
Greenline, Engineered Wood Veneer and Natural Dyed Wood Veneer, catalog, 12 pages, Known at least as early as Sep. 23, 2010.
Greenline, Cross-Reference Guide, 1 page, Known at least as early as Sep. 23, 2010.
Ipir Reconstituted Wood Veneers—Forest Collection as printed from http://www.greenlineforest.com/pages/ reconstituted.html, 29 pages, Known at least as early as Sep. 23, 2010.
Competitiveness of Tropical Timbers at the US Market, general overview, 9 pages, Known at least as early as Sep. 23, 2010.
Ye, Wood Composite Made of Populus Plantation Material in China, technical report, 9 pages, Known at least as early as Sep. 23, 2010.
Criteria for the Measurement of Sustainable Tropical Forest Management, ITTO Policy Development Series No. 3, 8 pages, ITTO, Mar. 25, 1992.
Clausen, et al., Selecting Superior Yellow Birch Trees, guide, 13 pages, U.S.A., Dec. 31, 1967.
Convention on International Trade in Endangered Species of Wild Fauna and Flora, notes from the Second meeting of the Mahogany Working Group Belem (Brazil), Oct. 6-8, 2003, 16 pages, Oct. 8, 2003.
Waverly Council, NSW. The Good Wood Guide: A Residents Guide to Purchasing Environmentally Friendly Timber, 9 pages, Known at least as early as Sep. 23, 2010.
Brown, et al., World View of Plantation Grown Wood, report, 12 pages, Forestry Department, Food and Agriculture Organization of the United Nations (FAO), Viale delle Terme di Caracalla, Rome, Italy, Known at least as early as Sep. 23, 2010.
Castro, et al., Cost Action E44 Final Conference in Milan on: A European Wood Processing Strategy: Future Resources Matching Products and Innovations. Poplar cultivation in Italy: history, state of the art, perspectives, 14 pages, Italy, Known at least as early as Sep. 23, 2010.
A & F Wood Products, Inc., guide and specifications of products, 14 pages, U.S.A., Known at least as early as Sep. 23, 2010.
Website information pages from http://www.alibaba.com/product-free/101370642/Bb.sub.--Cc.sub.--Plywood.s-ub.--Okoume.sub.--Plywood.sub.--Bintangor.sub.--Plywood.sub.--Red.sub.--Ha-rdwood.sub.--Plywood.sub.-- . . . , printed Sep. 1, 2009, 4 pages, Sep. 1, 2009.
Fascination Veneer, brochure, 11 pages, DanzerEuropeVeneer, Known at least as early as Sep. 23, 2010.
Plywood Panel Siding, chapter 4 in Wood: Detailing for Performance, 30 pages, Known at least as early as Sep. 23, 2010.
Cora Lam: HPL laminate with wood decorative surface., brochure, 9 pages, Italy, Known at least as early as Sep. 23, 2010.
Cora Prex: Engineered wood veneer, brochure, 15 pages, Italy, Known at least as early as Sep. 23, 2010.
Vicwood Group: Engineered Wood, 8 pages, Vicwood Development Ltd., Hong Kong, Mar. 22, 2006.
Vicwood Group: Flooring Collection, 12 pages, Vicwood Industry (Suzhou) Co., Ltd., China, Known at least as early as Sep. 23, 2010.
Forest Products Laboratory, Forest Service U.S. Department of Agriculture, Bleaching Wood, research report, 9 pages, Known at least as early as Sep. 23, 2010.
Responsible management of planted forests: Voluntary guidelines; Planted Forests and Tree Working Paper FP37E, 84 pages, Rome, Italy, Known at least as early as Sep. 23, 2010.
Mendoza, et al., Guidelines for Applying Multi-Criteria Analysis to the Assessment of Criteria and Indicators, The Criteria & Indicators (56) References Cited

OTHER PUBLICATIONS

Toolbox Series, 82 pages, Center for International Forestry Research (CIFOR), Indonesia, Known at least as early as Dec. 31, 1999.
Unit 1.01.00—Temperate and boreal silviculture, 5 pages, Known at least as early as Sep. 23, 2010.
Ye, Wood Composite Made of Populus Plantation Material in China, general technical report, 9 pages, Known at least as early as Sep. 23, 2010.
Ipir Reconstituted Wood Veneers—Forest Collection, 29 pages, from http://www.greenlineforest.com/pages/reconstituted.html, Known at least as early as Sep. 23, 2010.
Laminex Timber Veneers, brochure, 15 pages, Known at least as early as Sep. 23, 2010.
Material Explorer, description of Decora and printouts of samples, 4 pages, Known at least as early as Sep. 23, 2010.
Material Explorer, description of Casaleno and printouts of samples, 4 pages, Known at least as early as Sep. 23, 2010.
Material Explorer, description of Mafi Fresco and printouts of samples, 4 pages, Known at least as early as Sep. 23, 2010.
Material Explorer, description of Oval Nimbus and printouts of samples, 4 pages, Known at least as early as Sep. 23, 2010.
Wood and Articles of Wood; Wood Charcoal; Cork and Articles of Cork: Manufacturers of Straw, of Esparto or of Other Plaiting Materials; Basketware and Wickerwood, 31 pages, Known at least as early as Sep. 23, 2010.
Website information pages from http://canply.org/english/products/comparison/comparison.sub.--all.htm, 12 pages, Known at least as early as Sep. 23, 2010.
ALPI Divisione LEGNO, Technical data of Alpilignum decorative multilaminar veneer, compiled Jan. 18, 2008, 3 pages.
Webpage from http://www.alpi.it/uk/Articolo.asp?IdArt=103 showing information on ALPI headquarters, printed on Aug. 26, 2009, 1 page.

\* cited by examiner

METHODS AND BONDING AGENTS FOR FORMING WOOD VENEERS WITH NO ADDED FORMALDEHYDE ADHESIVES

BACKGROUND

1. Technical Field

The present disclosure relates to plywood veneers and, more specifically, to methods and bonding agents including no added formaldehyde adhesives for forming plywood veneers.

2. Discussion of Related Art

Some plywood panels used in the construction industry, furniture industry, cabinet industry, and the like commonly include one or more plies of tropical hardwoods that are used as an outer layer as a veneer. Veneered panels may be used for decorative or non-decorative applications such as flooring underlayment, wall paneling, portions of furniture and cabinetry, and the like.

Engineered veneers have been developed to provide a look of tropical hardwoods without using tropical hardwoods. Engineered veneers can be formed by forming an engineered veneer block of plies of wood and cutting the engineered veneer block to obtain an engineered veneer for use as an outer surface of a veneered panel.

The bonding agents used to bond the engineered veneer block have traditionally included formaldehyde as part of the adhesive of the bonding agent.

SUMMARY

Substantial efforts are being made to significantly reduce or eliminate formaldehyde from the manufacture of engineered veneers. Reduction or elimination of formaldehyde from plywood veneers may increase safety in their manufacture. Reduction or elimination of formaldehyde from engineered veneers may increase safety in their handling after manufacturing. Accordingly, there is a need for engineered veneers and panels with engineered veneers that contain reduced quantities of or no formaldehyde with the same or similar quality to current engineered veneers and panels. However, due to the thinness of the plies of wood used to form the engineered veneer blocks, and the thinness of the veneers themselves, no added formaldehyde adhesives have proved inadequate for forming the engineered veneer block to allow for slicing of the engineered veneers and maintaining a bond between the plies of wood in the engineered veneer after slicing.

In an aspect of the present disclosure, a method of forming an engineered veneer block includes stacking a plurality of laminate layers. The method includes spreading a bonding agent between each layer of the plurality of laminate layers. The bonding agent includes an adhesive. The adhesive consists essentially of one or more no added formaldehyde adhesives. The method includes slicing an engineered veneer from the engineered veneer block. The engineered veneer has thickness in the range of 0.1 millimeters to 0.5 millimeters.

In aspects, the method includes stating the plurality of laminate layers includes each laminate layer having a thickness in the range of 0.1 to 1.5 millimeters. The method may include mixing the bonding agent before spreading the bonding agent between the plurality of laminate layers. Mixing the bonding agent may include adding the adhesive.

The adhesive may consist essentially of a bio-based polymer, methylene diphenyl diisocyanate, and a thermoplastic. The bio-based polymer may be derived from soy, lignin, or tannins. The thermoplastic may be at least one of silicone rubber, polypropylene, polyurethane, polyvinyl chloride, polyethylene, acrylic, nylon, or combinations thereof.

Mixing the bonding agent may include adding an amount of water to the bonding agent based on a moisture content of the plurality of laminate layers.

In some aspects, the method includes pressing the stack of laminate layers. Pressing the stack of laminate layers may include pressing the stack of laminate layers before resistive heating the stack of laminate layers. Pressing the stack of laminate layers may include pressing the stack of laminate layers using a pressure in a range of 800 kilopascals to 5000 kilopascals.

In certain aspects, the method includes resistive heating the stack of laminate layers to cure the adhesive in the stack of laminate layers. Resistive heating the stack of laminate layers includes transmitting electrical energy through the stack of the plurality of laminate layers across each layer of the plurality of laminate layers. The electrical energy may be transmitted transversely across each laminate layer of the plurality of laminate layers with respect to the thickness of each laminate layer. Resistive heating the stack of laminate layers includes transmitting electrical energy through the stack of laminate layers to heat the stack to a temperature in the range of 36 degrees Celsius to 40 degrees Celsius.

In another aspect of the present disclosure, a bonding agent for forming an engineered veneer block includes an adhesive and a permeating agent. The adhesive consists essentially of one or more no added formaldehyde adhesives. The adhesive is configured to bond a plurality of laminate layers of wood having a thickness in a range of 0.5 millimeters to 1.5 millimeters together to form the engineered veneer block. The permeating agent is configured to improve permeation of the adhesive through at least one laminate layer of the plurality of laminate layers.

In aspects, the adhesive consists essentially of a bio-based polymer, methylene diphenyl diisocyanate, and a thermoplastic. The bio-based polymer may be derived from soy, lignin, or tannins. The thermoplastic may be at least one of silicone rubber, polypropylene, polyurethane, polyvinyl chloride, polyethylene, acrylic, nylon, or combinations thereof. The permeating agent may include polyvinyl alcohol, vinyl acetate, propylene glycol, or unsaturated polyester resin.

In another aspect of the present disclosure, an engineered veneer includes a plurality of laminate layers and a cured adhesive. Each laminate layer has a thickness in the range of 0.5 millimeters to 1.5 millimeters. The cured adhesive bonds the plurality of laminate layers together to form the engineered veneer. The adhesive consists essentially of one or more no added formaldehyde adhesives.

In aspects, the engineered veneer has a thickness in the range of 0.1 to 0.5 millimeters. The adhesive may consist essentially of a bio-base polymer, methylene diphenyl diisocyanate, and a thermoplastic. The thermoplastic may be at least one of silicone rubber, polypropylene, polyurethane, polyvinyl chloride, polyethylene, acrylic, nylon, or combinations thereof.

In another aspect of the present disclosure, an engineered veneer panel includes a substrate and an engineered veneer bonded to the substrate. The engineered veneer includes a plurality of laminate layers and a cured adhesive. Each laminate layer has a thickness in the range of 0.5 millimeters to 1.5 millimeters. The cured adhesive bonds the plurality of laminate layers together to form the engineered veneer. The adhesive consists essentially of one or more no added formaldehyde adhesives.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are not necessarily drawn to scale, which are incorporated in and constitute a part of this specification, wherein.

DETAILED DESCRIPTION

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships, or the like, unless otherwise stated, any one or more if not all of these may be absolute or approximate to account for acceptable variations that may occur, such as those due to manufacturing or engineering tolerances or the like.

Figure 1:
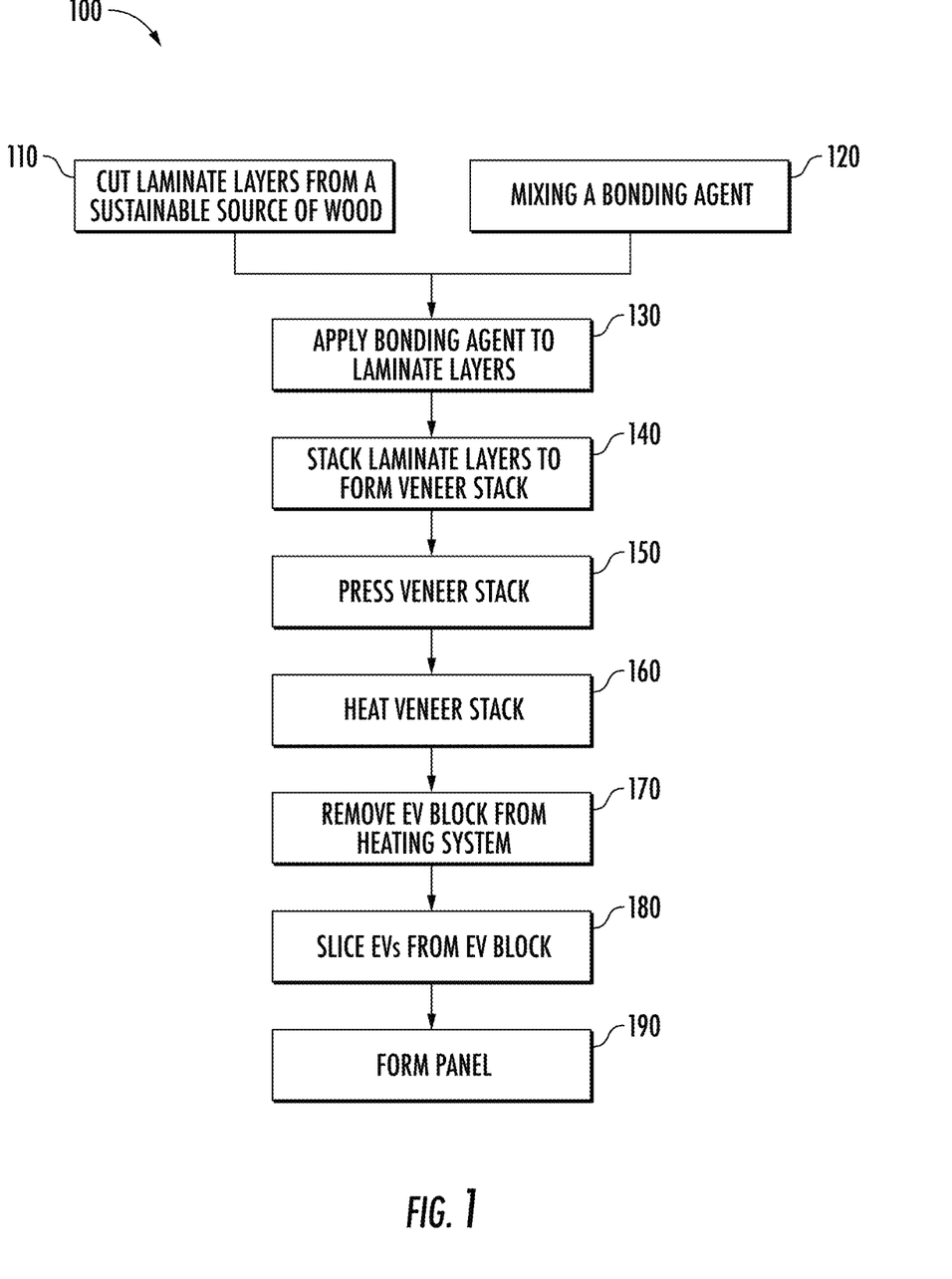
FIG. 1 is a flowchart of a method of forming an Engineered Veneer Panel provided in accordance with the present disclosure.
Figure 6:
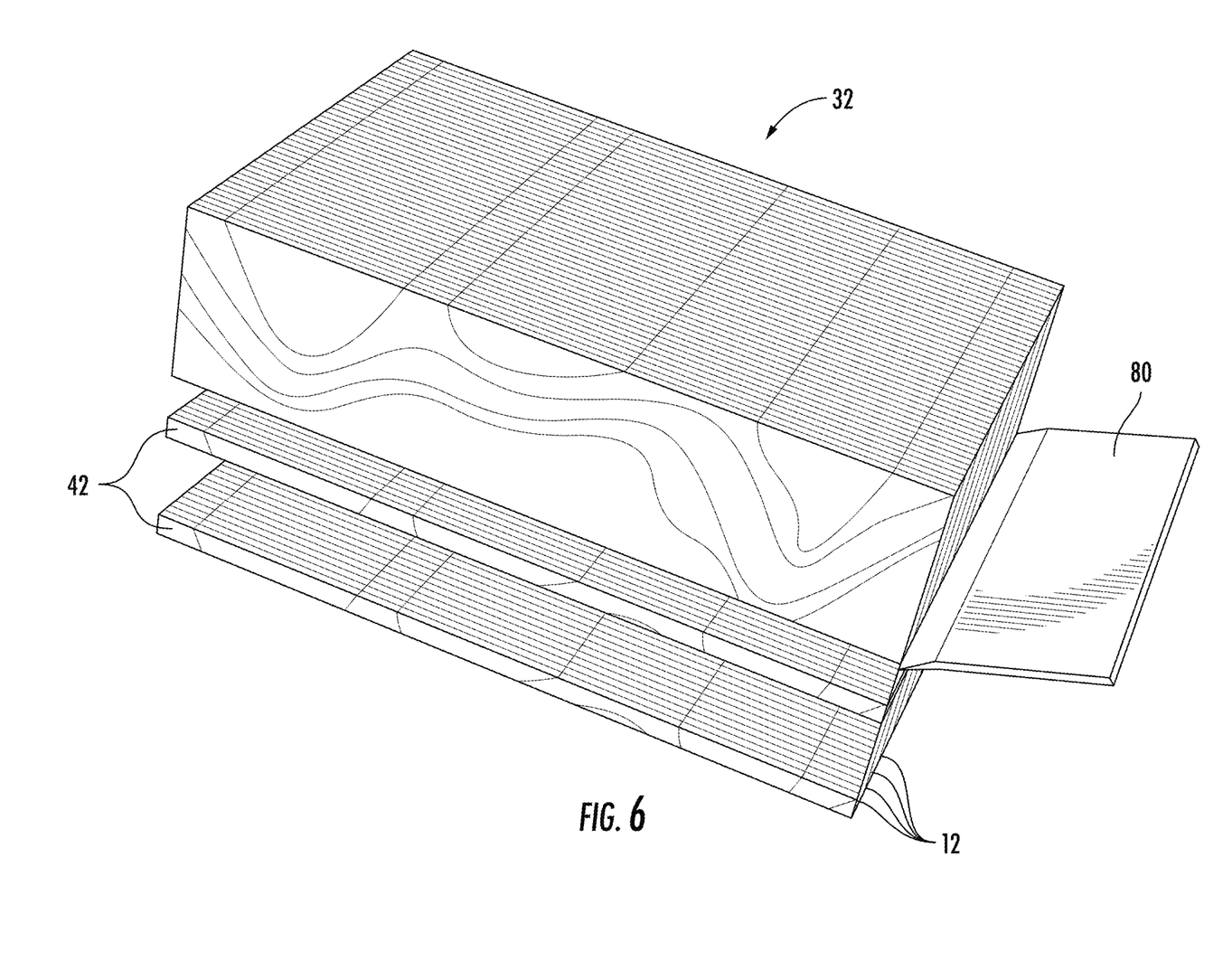
FIG. 6 is a perspective view of an Engineered Veneer sliced from an Engineered Veneer block in accordance with embodiments of the present disclosure.

Referring to FIG. 1, a method 100 of forming an Engineered Veneer (EV) 42 is described in accordance with the present disclosure. The EV 42 is formed by a plurality of laminate layers 12 that are stacked and bonded together with one or more adhesives. The laminate layers 12 are each thin slices of a sustainable source of wood. The laminate layers 12 are bonded together using a no added formaldehyde adhesive (NAF adhesive) to form an Engineered Veneer Block (EV Block) 32 (FIG. 6). In some embodiments, the laminate layers 12 may be bonded with a no added urea formaldehyde adhesive (NAUF adhesive) to form an EV Block 32. The laminate layers 12 may be from a single source of wood or may be from multiple sources or types of wood that are stacked and bonded to form the EV block 32 as detailed below. The EV 42 may be sliced from the EV block 32. Once sliced from the EV block 32, the EV 42 may have a thickness in the range of 0.1 mm to 1.5 mm, e.g., 0.2 mm. The EV 42 may be bonded to a core or substrate 60 to form a panel 62, e.g., a veneered panel.

The method 100 overcomes various problems encountered in previous attempts by others to form EVs and EV blocks using NAF adhesives. Specifically, previous attempts to use an NAF adhesive instead of previously used adhesives containing formaldehyde or formaldehyde-urea adhesives, resulted in the EV block splitting or completely falling apart before or during slicing of EVs from the EV block. The method 100 and the NAF adhesives described herein overcome allow an EV block to be formed and EVs to be sliced from the EV blocks, e.g., EV blocks 32.

Figure 2:
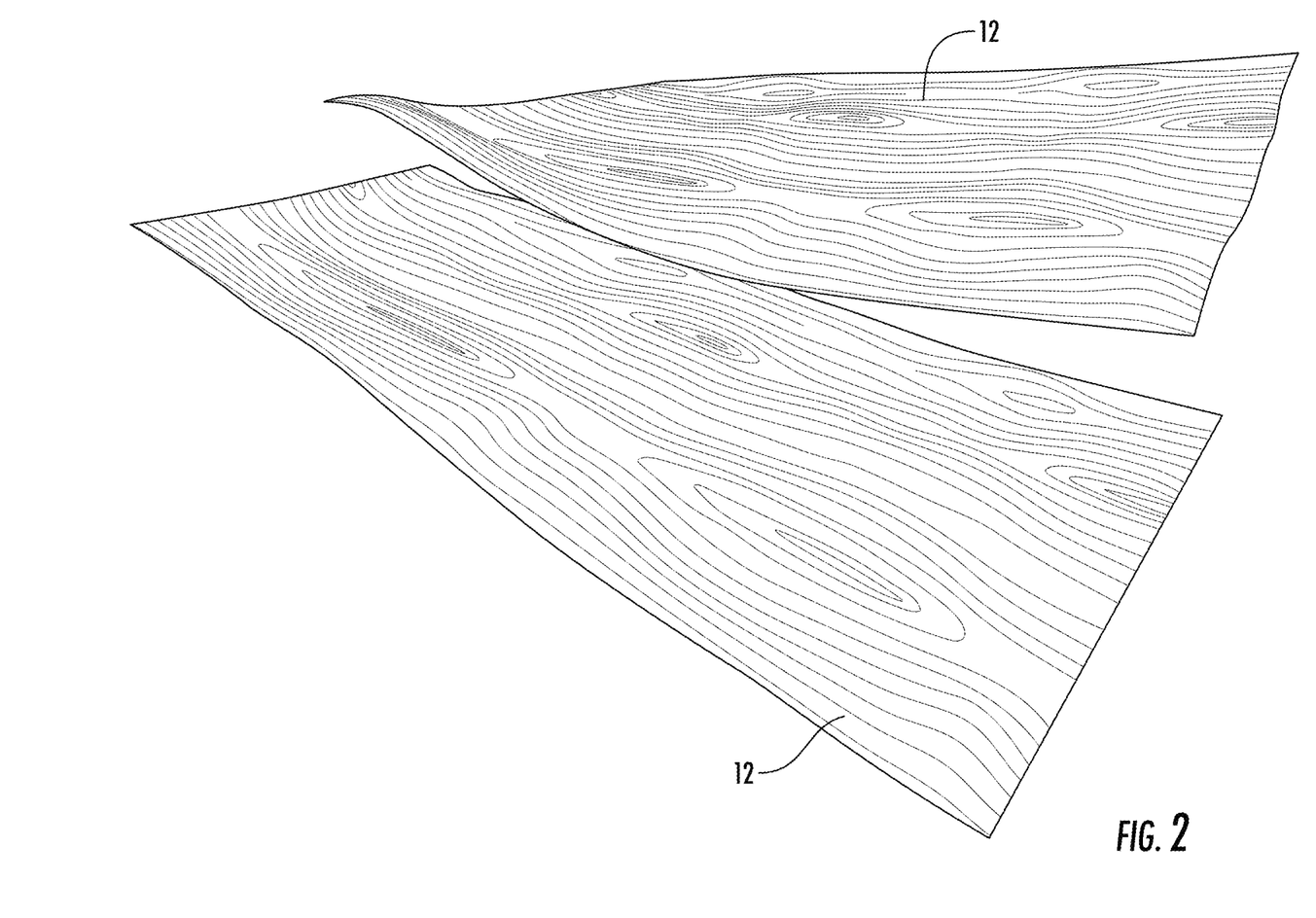
FIG. 2 is a perspective view of laminate layers.

Additionally referring to FIG. 2, the method 100 may include cutting the laminate layers 12 from the source or sources of wood (Step 110). The laminate layers 12 may be in a range of 0.5 mm to 1.5 mm thick, e.g., 0.8 mm or 0.9 mm. Each laminate layer 12 may have the same thickness. In some embodiments, the laminate layers 12 have varying thicknesses. The thickness of each respective laminate layer 12 may determine the appearance of the EV 42 once sliced from the EV block 32. For example, when sliced from the EV block 32 the EV 42 may have an appearance that mimics that of natural wood grain as result of thinner or thicker laminate layers 12. Different thicknesses of laminate layers 12 may mimic different species of wood grain in the resulting EV 42.

The method 100 includes mixing a bonding agent to bond the laminate layers 12 together (Step 120). The bonding agent may include water, an adhesive, and a permeating agent. The permeating agent may assist the adhesive and moisture in permeating through the wood of the laminate layers 12. Mixing the bonding agent may include pouring the components of the bonding agent into a stirring machine and stirring the components until the components are evenly and completely mixed. The bonding agent may be stirred at room temperature. The bonding agent may be stirred in a range of 10 to 20 minutes to mix the bonding agent.

The bonding agent used in the method 100 to form the EV 42 may be an improvement over previous bonding agents used in the manufacture of veneers. Specifically, the adhesives used in the bonding agent consist essentially of no added formaldehyde adhesives (NAF adhesives). Namely, the adhesive may include other elements that are inert or perform functions besides that of an adhesive. For example, the adhesive may include, but is not limited to, emulsifiers, thickeners, or a retardant or an accelerant to slow or speed curing of the adhesive, respectively. The bonding agents used in the method 100 may allow the EVs 42 to be sliced from the EV block 32 having a thickness in the range of 0.1 mm to 1.5 mm, e.g., 0.2 mm, 0.4 mm, 0.8 mm, 1 mm, or 1.2 mm. The thickness of the EV 42 may vary depending on application. For example, where the EV 42 may be exposed to more weathering a thicker EV 42 may be used than an EV 42 used for ornamental purposes. The no added formaldehyde adhesive may be a bio-based polymer or resin. As used herein the term "bio-based polymer" refers to materials for which at least a portion of the polymer consists of material produced from renewable raw materials. For example, bio-based polymers may be produced from corn, soy, lignin, tannins, or sugarcane. The NAF adhesive may be Soyad™ Adhesive Technology from Solenis™ or NatureBind™ from Garnica™. In embodiments, the NAF adhesive may include one or more thermoplastic materials. The NAF adhesive may be a mixture of one or more bio-based polymers and one or more thermoplastics. The thermoplastics used in the NAF adhesive may include, but are not limited to, silicone rubbers, polyolefins (such as polyethylene or polypropylene), polyurethane, polyvinyl chloride, acrylic, nylon, or combinations thereof. The NAF adhesive may have a concentration of thermoplastic material in the range of 1%-35%, e.g., 5%, 10%, 15%, 20%, 25%, or 30%. The NAF adhesive may include methylene diphenyl diisocyanate (MDI). In embodiments, the NAF adhesive may have a concentration of MDI in the range of 1%-35%, e.g., 5%, 10%, 15%, 20%, 25%, or 30%. The NAF adhesive may include bio-based polymers, thermoplastics, and MDI.

In contrast to the bonding agents consisting essentially of NAF adhesives used in method 100, previous attempts to use bonding agents that contain NAF adhesives in the manufacture of engineered veneers and an engineered panels have been unsuccessful. Notably, previous bonding agents including NAF adhesives were not suitable for manufacture of veneers. Specifically, veneers of having a thickness similar to that of conventional veneers made with formaldehyde adhesives could not be made using previous bonding agents including NAF adhesives without breakage. The previous bonding agents could cause the EV or the EV block to fall apart or split when sliced. The previous bonding agents could create an overly rigid EVs or EV blocks that is difficult to slice and/or create a rough surface when the EV is sliced from the EV block. This may result in an undesirable surface finish require additional processing, e.g., sanding or planing, to achieve the desired surface finish. Additionally or alternatively, these previous bonding agents could be hard to control and difficult to cure.

Continuing to refer to FIG. 1, the bonding agent used in the method 100 may include a permeating agent to permeate through the wood of the laminate layers 12. The permeating agent may include vinyl acetate and polyvinyl alcohol as major components thereof. In particular embodiments, the permeating agent may be formulated to include 35% or more polyvinyl alcohol, e.g., 35%, 40%, 45%, or 50%, and 15% or more vinyl acetate, e.g., 15%, 20%, 25%, or 30%. In some embodiments, the permeating agent may include propylene glycol, unsaturated polyester resin, and/or water. In certain embodiments, the permeating agent includes 10% or less water.

The bonding agent may be formulated to include the permeating agent in a range of 0.7% to 1%, water in a range of 0 to 3%, and adhesive in a range of 96% to 99%. The permeating agent may allow the adhesive and/or moisture to permeate the wood. In some embodiments, the bonding agent detailed herein may make the finished EV block 32 flexible and/or suitable for slicing.

Figure 3:
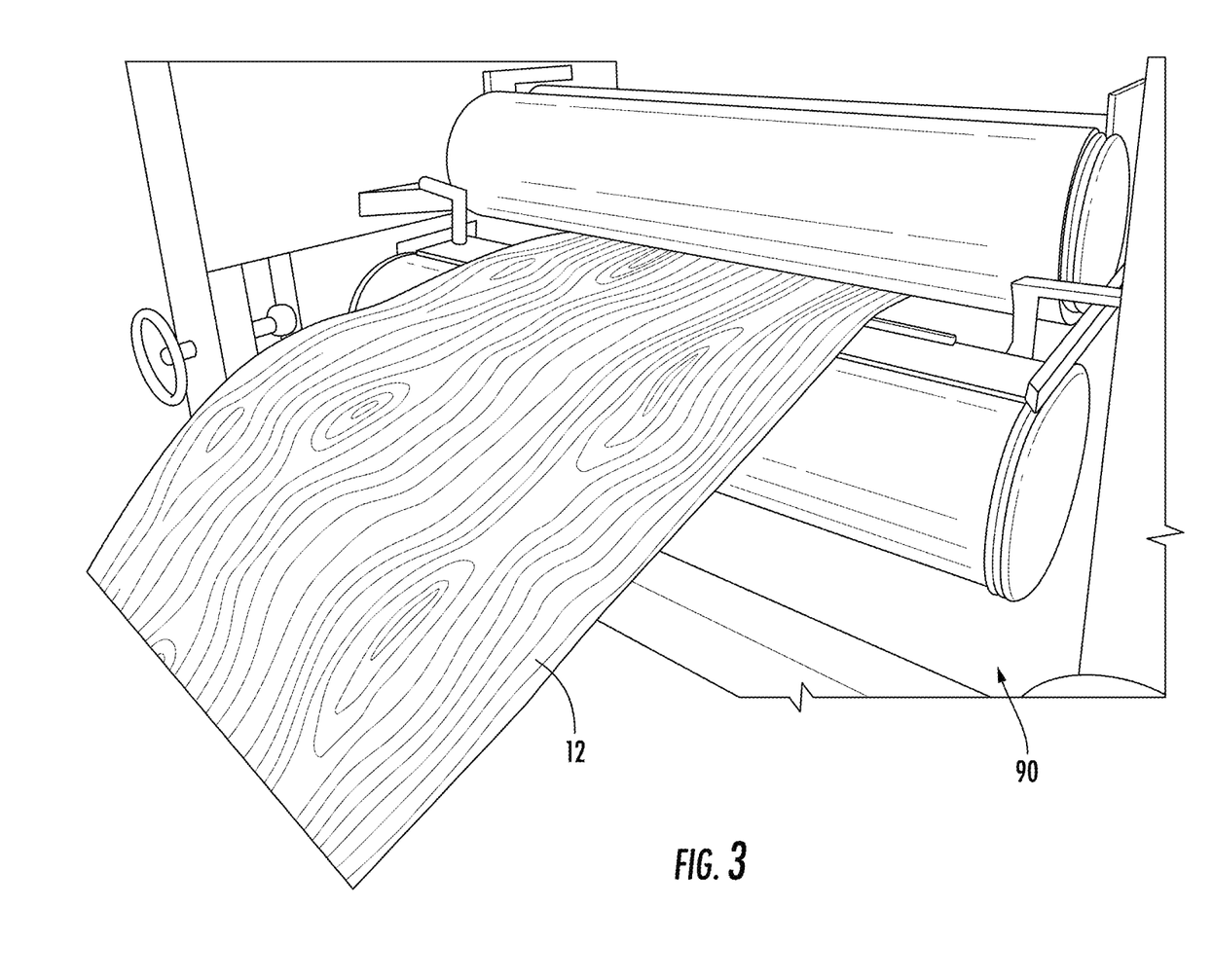
FIG. 3 is a perspective view of a laminate layer with a bonding agent applied thereto.

Referring to FIG. 3, when the bonding agent is mixed and the laminate layers 12 are cut, the bonding agent is applied to the laminate layers 12 (Step 130). The bonding agent may be applied to the laminate layers 12 by loading a spreading machine 90 with the bonding agent and passing one or more of the laminate layers 12 through the spreading machine 90 as shown. Each laminate layer 12 may be passed through the spreading machine 90 to have the bonding agent applied thereto. In embodiments, only some of the laminate layers 12 have the bonding agent applied thereto. For example, a laminate layer 12 may have the bonding agent applied to both sides thereof and sandwiched between two laminate layers 12 without the bonding agent applied thereto. In some embodiments, the bonding agent permeates through the laminate layers 12 to bond adjacent laminate layers 12 together.

Figure 4:
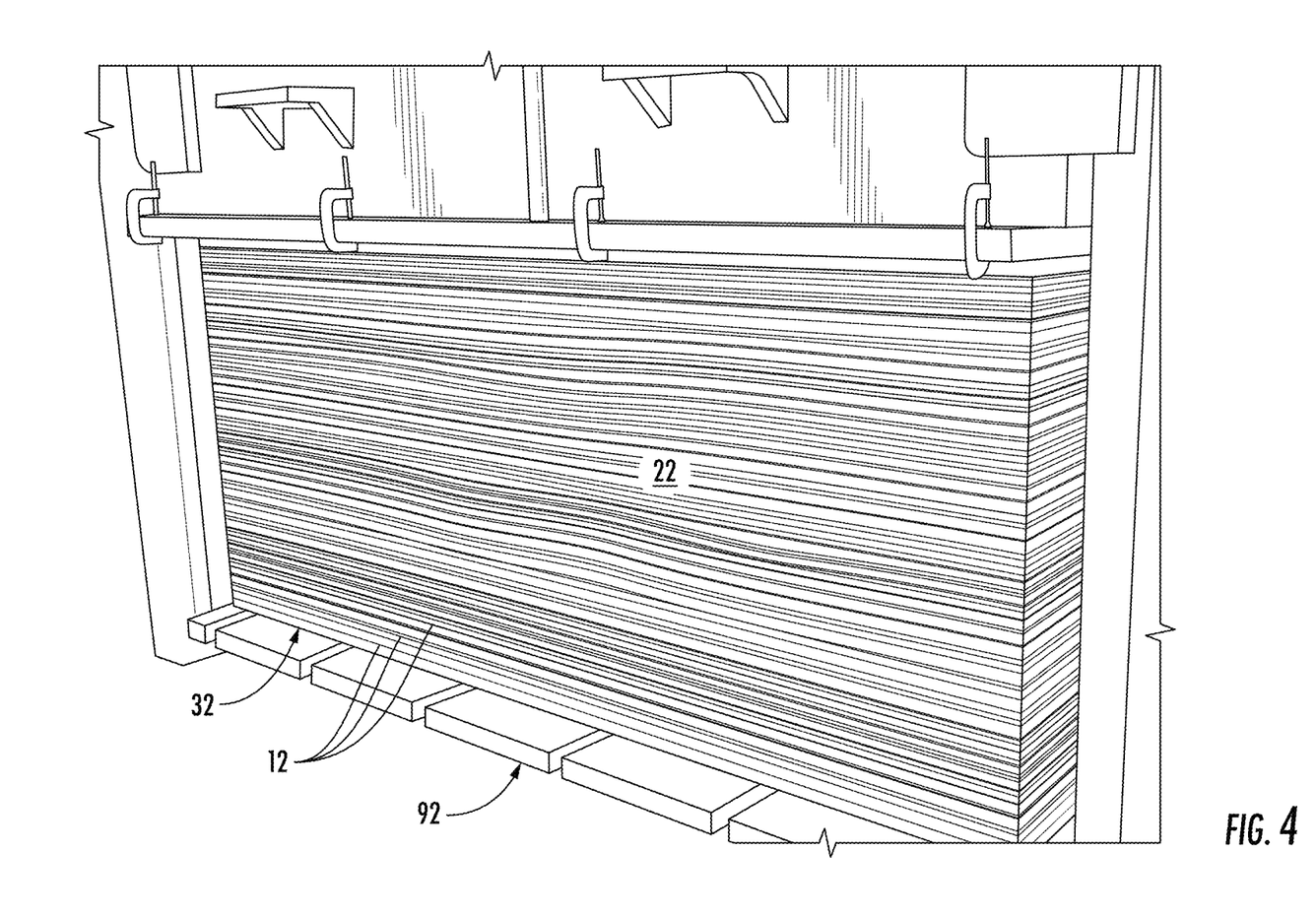
FIG. 4 is a perspective view of a stack of laminate layers in a pressing machine.

Referring to FIG. 4, as the laminate layers 12 are passed through the spreading machine 90, the laminate layers 12 are stacked on top of one another to form a veneer stack 22 (Step 140). In embodiments where every laminate layer 12 is passed through the spreading machine 90, the laminate layers 12 may be stacked as each layer comes out of the spreading machine 90. In certain embodiments, the laminate layers 12 may be inspected for damage and repaired or discarded before being placed in the veneer stack 22 or passed through the spreading machine 90.

The laminate layers 12 are stacked until the veneer stack 22 reaches a desired thickness for the EV block 32. For example, each laminate layer 12 may have a length in a range of 2500 mm (98 inches) to 2600 mm (102 inches), e.g., 2560 mm (100 inches), a width in a range of 680 mm (26.5 inches) to 760 mm (30 inches), e.g., 720 mm (28 inches), and a thickness in a range of 0.85 mm (0.033 inches) to 1 mm (0.04 inches). The veneer stack 22 may include a range of 1600 to 1900 laminate layers 12 such that the veneer stack 22 has a total height in a range of 1200 mm (47 inches) to 1400 mm (55 inches), e.g., 1300 mm (51 inches).

Continuing to refer to FIG. 4, with the veneer stack 22 formed, the veneer stack 22 is placed in a pressing machine 92. The pressing machine 92 may be a cold press or a hot press. In some embodiments, the laminate layers 12 are stacked in the pressing machine 92 during Step 140. The pressing machine 92 is activated to press the veneer stack 22 to compress the laminate layers 12 together and allow the bonding agent to permeate through all of the laminate layers 12 (Step 150). The pressing machine 92 may apply a range of 800 kilopascals (kPa) to 5000 kPA to compress the laminate layers 12 for period of time. The period of time for compressing the laminate layers may vary based on a variety of factors including, but not limited to, the thickness of each laminate layer 12, the size and dimensions of the veneer stack 22, the number of laminate layers 12 in the veneer stack 22, the formulation of the bonding agent, pressure exerted on the veneer stack 22, and/or environmental factors such as temperature or humidity. The period of time for compression may be on the order of minutes to days. In embodiments, the veneer stack 22 may be compressed for approximately 10 minutes, 20 minutes, 30 minutes, 40 minutes, or 50 minutes. In some embodiments, the veneer stack 22 is compressed for a period of time in the range of 1 hour to 12 hours. In certain embodiments, the veneer stack is compressed for a period of in the range of 1 day to 7 days. The press duration may allow the NAF adhesive to permeate through the laminate layers 12. The press duration may allow the NAF adhesive to fully cure.

Figure 5:
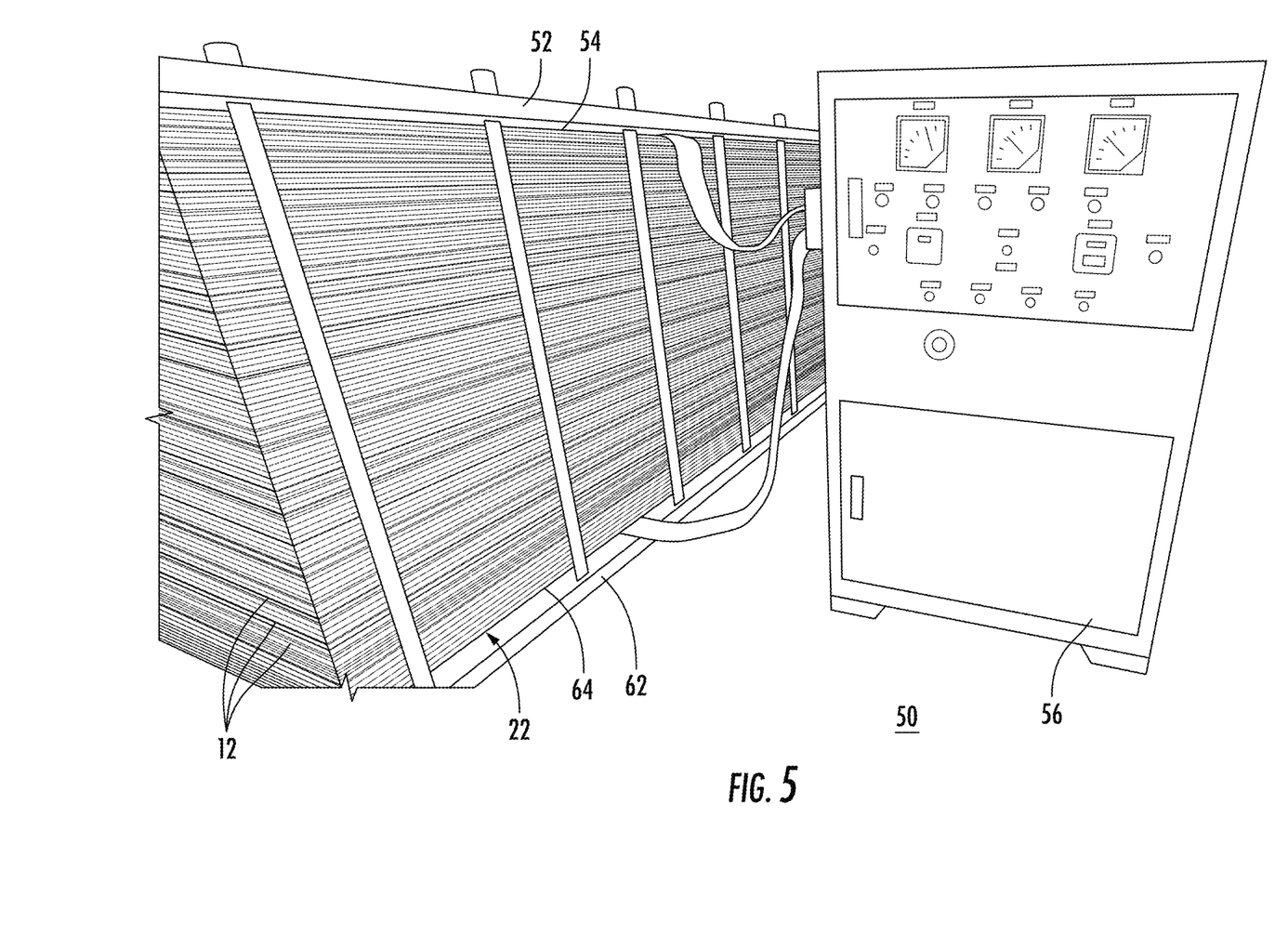
FIG. 5 is a perspective view of the stack of laminate layers in a heating system to form an Engineered Veneer Block.

Referring now to FIG. 5, the compressed veneer stack 22 is heated to cure the adhesive in the bonding agent (Step 160). The veneer stack 22 may be heated in a conventional steam kiln. In embodiments, the veneer stack 22 may be resistively heated. For example, the veneer stack 22 may be heated by a resistive heating system as described in U.S. patent application Ser. No. 18/142,060, filed May 2, 2023. An example resistive heating system 50 may include a top insulator 52, bottom insulator 62, a top conductor 54 in contact with the topmost laminate layer 12 of the veneer stack 22, a bottom conductor 64 in contact with the bottommost laminate layer 12 of the veneer stack 22, and a power source 56, as shown in FIG. 5. The veneer stack 22 may act as a resistor between conductors 54, 64 of the resistive heating system 50 such that the veneer stack 22 is heated by resistive heating. Using resistive heating to heat the veneer stack 22 may use less energy than heating via a steam kiln. Using resistive heating may heat the entire veneer stack 22 evenly. Evenly curing the adhesive may decrease failures when slicing the EV block 32 in to EVs 42. The electrical energy may pass or flow through the veneer stack 22 across the thickness of each laminate layer 12 between the top conductor 54 and the bottom conductor 64. The electrical energy may flow through each laminate layer 12 transverse to the thickness of each laminate layer 12.

The veneer stack 22 may be heated to a temperature in a range of 36 degrees Celsius to 40 degrees Celsius, e.g., 38 degrees Celsius. The temperature of the veneer stack 22 may be measured by one or more sensors disposed on, in, or about the veneer stack 22. In some embodiments, the temperature of the veneer stack 22 may be calculated based, at least partially, on an amount of power provided by the power source 56 of the resistive heating system 50. The temperature of the veneer stack 22 is maintained for a predetermined amount of time to fully cure the adhesive of the bonding agent. The predetermined amount of time the temperature of the veneer stack 22 is maintained may vary based on a variety of factors. For example, the factors for determining the amount of time may include, but are not limited to, the thickness of each laminate layer 12, the thickness on the veneer stack 22, the number of laminate layers 12 in the veneer stack 22, the formulation of the bonding agent, pressure exerted on the veneer stack 22, the moisture content of the laminate layers 12, the species of wood making up the laminate layers 12, and/or environmental factors such as temperature or humidity. The predetermined amount of time for maintaining the veneer stack 22 at the curing temperature may be on the order of minutes to days. In embodiments, the veneer stack 22 may be maintained at the curing temperature for approximately 10 minutes, 20 minutes, 30 minutes, 40 minutes, or 50 minutes. In some embodiments, the veneer stack 22 is maintained at the curing temperature for a period of time in the range of 1 hour to 12 hours. In certain embodiments, the veneer stack may be maintained at the curing temperature for a period of time in the range of 1 day to 15 days.

Referring to FIG. 6, after the predetermined amount of time, the adhesive of the bonding agent is cured and the veneer stack 22 forms the EV block 32. When the EV block 32 is formed, the EV block 32 is removed from the heating system 50 (Step 170). The EV block 32 is then sliced into a plurality of EVs 42 (Step 180). The EV 42s may be sliced from the EV block 32 using a knife 80. The knife 80 may be knife 80 or slicing machine known in the art for slicing engineered veneers. Each EV 42 may include a strip of substantially all of the laminate layers 12 of the EV block 32. Each EV 42 may be sized to form the surface of a layered building material, e.g., plywood, such that the layered building material resembles a wood panel but is formed of sustainable wood sources. The EV 42 may be sliced from the EV block 32 to have a thickness in the range of 0.05 mm to 1.5 mm, e.g., 0.2 mm. As noted above, veneers of such a thickness have in the past been unattainable using bonding agents having adhesives where the adhesives of the bonding agent consist essentially of NAF adhesives.

Figure 7:
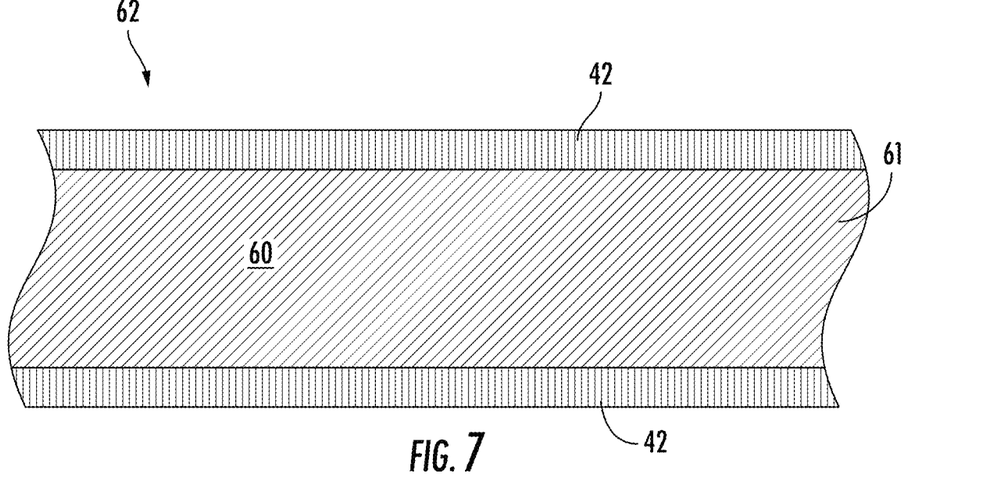
FIG. 7 is a cross-sectional view of a panel including an engineered veneer in accordance with embodiments of the present disclosure.
Figure 8:
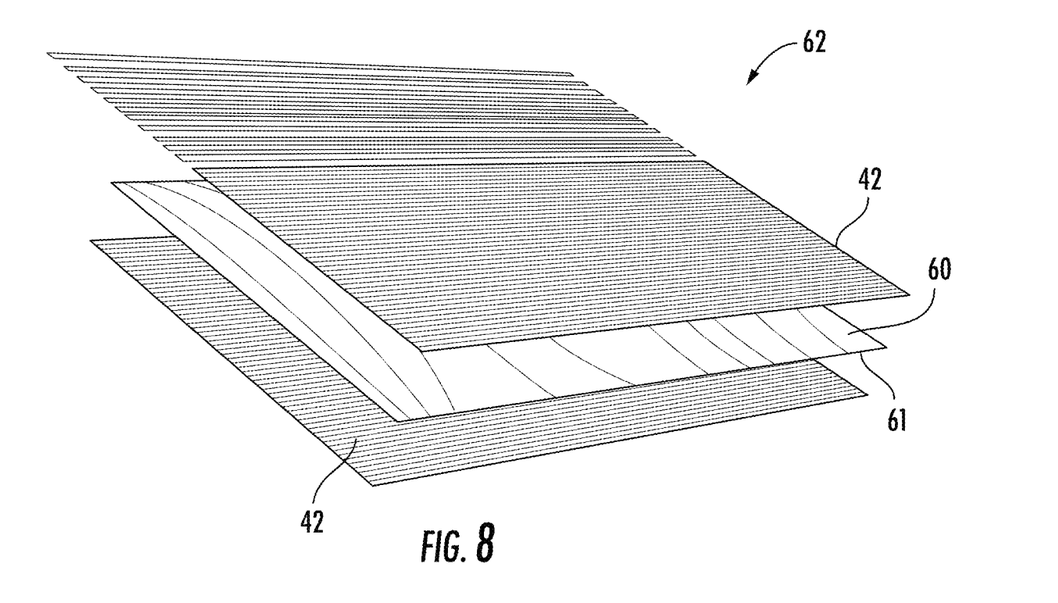
FIG. 8 is an exploded perspective view of the panel of FIG. 7.
Figure 9:
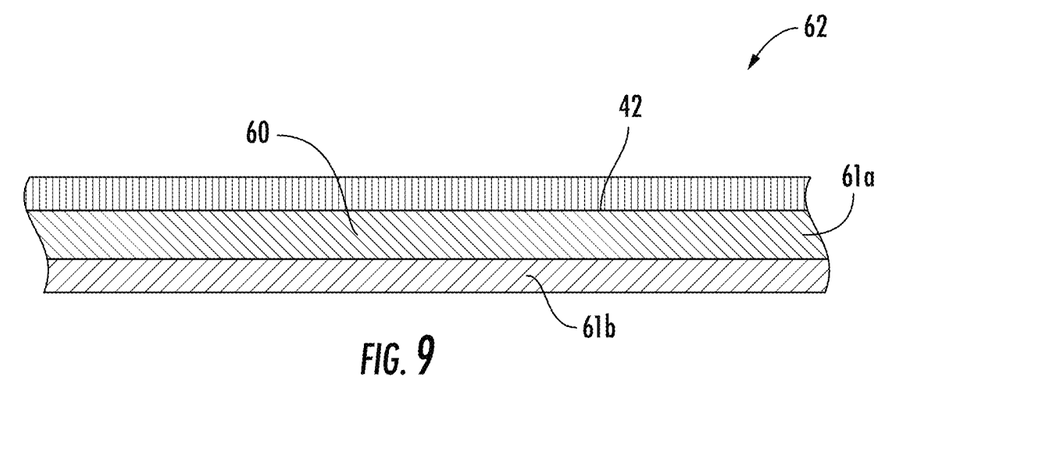
FIG. 9 is a cross-sectional view of another panel including an engineered veneer in accordance with embodiments of the present disclosure.
Figure 10:
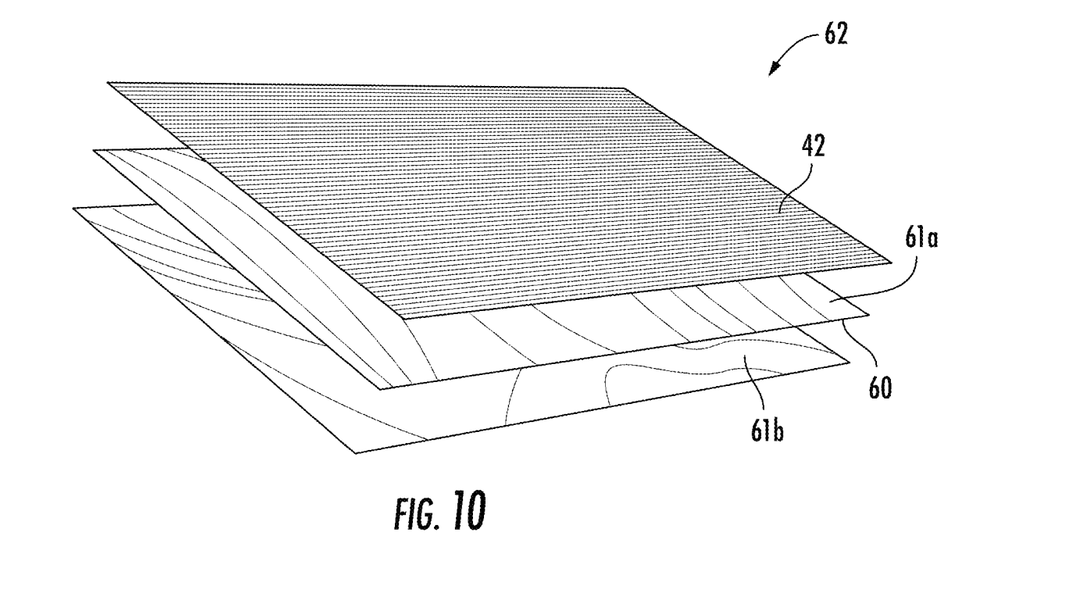
FIG. 10 is an exploded perspective view of the panel of FIG. 9.

Referring to FIGS. 7-10, the EV 42 may be bonded to a core or a substrate 60 to form a veneered panel 62 (Step 190). The substrate 60 may be formed of a single ply 61 of material (FIGS. 7 and 8) or more than ply 61a, 61b of material (FIGS. 9 and 10). The substrate 60 may be made of solid wood, particle board, medium density fiberboard (MDF), plywood, or a composite material such as fiber glass or carbon fiber. The substrate 60 may be one or more of the laminate layers 12. In some embodiments, some or all of the plies 61 may be scrap pieces of the laminate layers 12 or scrap pieces of the EV 42. The scrap pieces may have been damaged during manufacturing. The panel 62 may have the EV 42 on a single side of the substrate 62 (FIGS. 9 and 10) or on both sides of the substrate 60 (FIGS. 7 and 8). The layers of the substrate 60 may be bonded together using the same NAF adhesive used in the EV 42. In embodiments, the layers of the substrate 60 may be bonded using a different NAF adhesive. The EV 42 may be bonded to the substrate 60 using the same NAF adhesive used to bond the laminate layers 12 of the EV 42 or a different NAF adhesive.

Although the method steps are described in a specific order, it should be understood that other steps may be performed in between described steps, described steps may be adjusted so that they occur at slightly different times, or the described steps may occur in any order unless otherwise specified.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of forming an engineered veneer block, the method comprising:
   stacking a plurality of laminate layers into a stack, each layer of the plurality of layers having a thickness in the range of 0.1 millimeters to 1.5 millimeters;
   spreading a bonding agent between each layer of the plurality of laminate layers to form the stack into an engineered veneer block, the bonding agent comprising an adhesive, the adhesive consisting essentially of one or more no added formaldehyde adhesives; and
   slicing an engineered veneer from the engineered veneer block.

2. The method according to claim 1, further comprising mixing the bonding agent before spreading the bonding agent between each layer of the plurality of laminate layers.

3. The method according to claim 2, wherein mixing the bonding agent includes adding the adhesive, the adhesive consisting essentially of a bio-based polymer, methylene diphenyl diisocyanate, and a thermoplastic.

4. The method according to claim 3, wherein the thermoplastic is at least one of silicone rubber, polypropylene, polyurethane, polyvinyl chloride, polyethylene, acrylic, nylon, or combinations thereof.

5. The method according to claim 1, further comprising pressing the stack of the plurality of laminate layers.

6. The method according to claim 5, wherein pressing the stack of the plurality of laminate layers includes pressing the stack of the plurality of laminate layers before resistive heating the stack of the plurality of laminate layers.

7. The method according to claim 5, wherein pressing the stack of the plurality of laminate layers includes pressing the stack of the plurality of laminate layers using a pressure in a range of 800 kilopascals to 5000 kilopascals.

8. The method according to claim 1, further comprising resistive heating the stack of the plurality of laminate layers to cure the adhesive in the stack of the plurality of laminate layers.

9. The method according to claim 8, wherein resistive heating the stack of the plurality of laminate layers includes transmitting electrical energy through the stack of the plurality of laminate layers across each layer of the plurality of laminate layers, the electrical energy transmitted transversely across each layer of the plurality of laminate layers with respect to the thickness of each layer.

10. The method according to claim 8, wherein resistive heating the stack of the plurality of laminate layers includes transmitting electrical energy through the stack of the plurality of laminate layers to heat the stack to a temperature in the range of 36 degrees Celsius to 40 degrees Celsius.

11. A method of forming an engineered veneer block, the method comprising:
stacking a plurality of laminate layers into a stack, each layer of the plurality of laminate layers having a thickness in a range of 0.1 millimeters to 1.5 millimeters;
spreading a bonding agent between each layer of the plurality of laminate layers to form the stack into an engineered veneer block, the bonding agent comprising an adhesive, the adhesive consisting essentially of one or more no added formaldehyde adhesives; and
slicing an engineered veneer having a thickness in the range of 0.1 millimeters to 0.5 millimeters from the engineered veneer block such that the engineered veneer includes each layer of the plurality of laminate layers.

12. The method according to claim 11, further comprising mixing the bonding agent before spreading the bonding agent between each layer of the plurality of laminate layers.

13. The method according to claim 11, wherein mixing the bonding agent includes adding the adhesive, the adhesive consisting essentially of a bio-based polymer, methylene diphenyl diisocyanate, and a thermoplastic.

14. The method according to claim 13, wherein the thermoplastic is at least one of silicone rubber, polypropylene, polyurethane, polyvinyl chloride, polyethylene, acrylic, nylon, or combinations thereof.

15. The method according to claim 13, wherein mixing the bonding agent includes adding a permeating agent to the bonding agent configured for the to improve permeation of the adhesive of the bonding agent through at least one of the laminate layers of the plurality of laminate layers.

16. The method according to claim 15, wherein the permeating agent comprises at least one of polyvinyl alcohol, vinyl acetate, propylene glycol, or unsaturated polyester resin.

17. The method according to claim 11, further comprising bonding the engineered veneer to a substrate to form a veneered panel.

18. The method according to claim 11, wherein stacking the plurality of laminate layers includes stacking a number of the laminate layers in a range of 1400 laminate layers to 1900 laminate layers.

19. The method according to claim 11, wherein stacking the plurality laminate layers includes stacking a number of the laminate layers such that a height of the stack is in a range of 1200 millimeters to 1400 millimeters.

\* \* \* \* \*

UNITED STATES PATENT AND TRADEMARK OFFICE
CERTIFICATE OF CORRECTION

PATENT NO. : 12,311,570 B1
APPLICATION NO. : 18/781079
DATED : May 27, 2025
INVENTOR(S) : Paul D. Senior Page 1 of 1

It is certified that error appears in the above-identified patent and that said Letters Patent is hereby corrected as shown below:

In the Claims

Claim 15; Column 10 Line 18:
Delete the phrase "to improve".

Signed and Sealed this
First Day of July, 2025

Coke Morgan Stewart
*Acting Director of the United States Patent and Trademark Office*